United States Patent Office 2,921,562
Patented Jan. 19, 1960

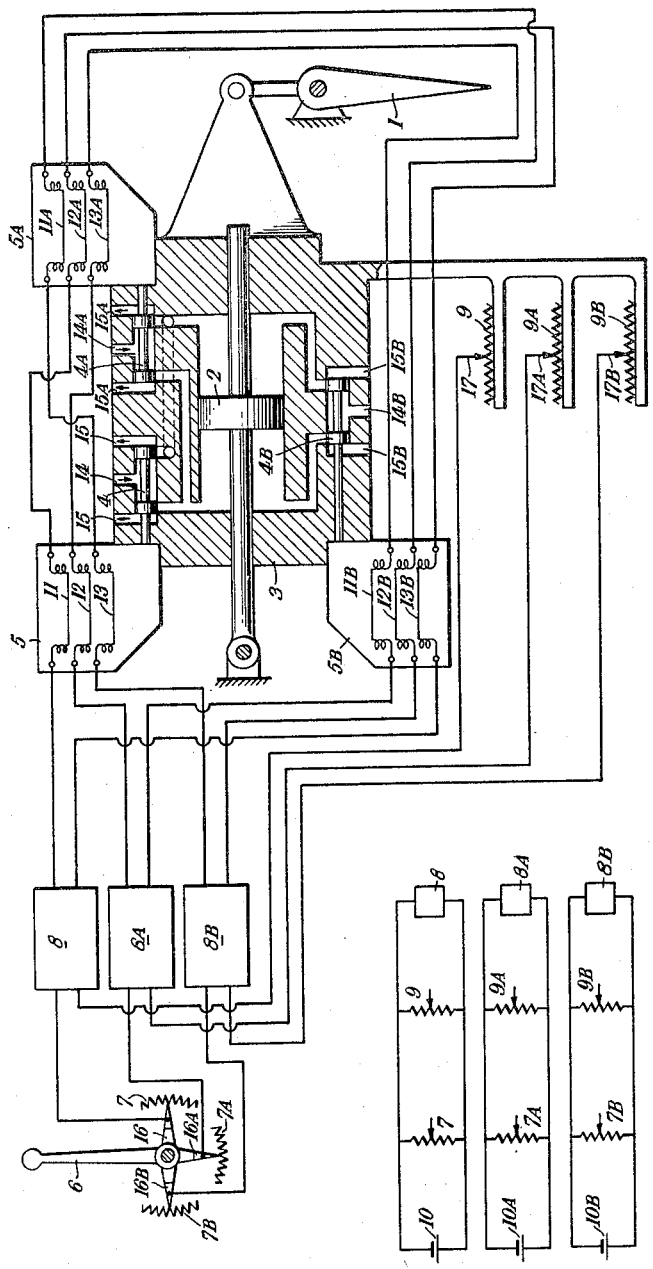

2,921,562

FLYING CONTROL SYSTEM FOR AIRCRAFT

Roy Westbury, Bridgnorth, England, and Charles Philip Smith, Ramsey, Isle of Man, assignors to H. M. Hobson Limited, London, England, a British company Application December 14, 1955, Serial No. 553,124

Claims priority, application Great Britain December 17, 1954

5 Claims. (Cl. 121—41)

This invention relates to a power operated flying control system for aircraft of the kind in which a pilot's control member controls by means of an electrical signalling system the position of the input member of a servo motor for actuating a control surface of the aircraft.

With a view to safeguarding against the contingency of failure of electrical signalling systems, the invention provides a system of the above kind including at least three electrical signalling systems all operable by the pilot's control member, the servo motor having at least three independently movable input members, each operated by an electro-mechanical transducer mechanism, and means for feeding signals from all the signalling systems to each of the transducer mechanisms.

One embodiment of the invention will be described in more detail, by way of example, with reference to the accompanying drawings in which:

Fig. 1 is a diagram illustrating the servo motor and associated electrical signalling systems and Fig. 2 is a circuit diagram.

The control surface 1 is operated by a hydraulic servo motor having a fixed piston 2 and a movable cylinder 3 coupled to the control surface. The servo motor is controlled by three control valves 4, 4A, 4B constituting individually movable input members of the servo motor. The control valves are associated with pressure inlets 14, 14A, 14B and exhaust outlets 15, 15A, 15B and are movable in opposite directions from the neutral position shown in the well known manner to establish alternative pressure and exhaust connections to the ends of the cylinder 3, so causing the latter, which constitutes the output member of the servo motor, to move to an extent determined by the displacement of the control valves. The control valves are actuated by electro-mechanical transducers 5, 5A, 5B respectively.

The transducers are of the kind described in U.S. application Serial No. 549,737, filed November 29, 1955, now Patent No. 2,859,926 and each comprises a rotary armature coupled to the associated control valve and movable between pole pieces around which are wound three coils 11, 12, 13.

The pilot's control lever 6 coacts with the potentiometers 7, 7A, 7B of three electrical signalling systems, each including an amplifier 8, 8A, 8B. The signals from each amplifier are supplied as shown, to a coil of each of the transducers, the signals for example from amplifier 8 being passed in series through the coils 11, 12A and 13B. Potentiometers 9, 9A, 9B operated by movement of the cylinder 3 supply feed back signals to the amplifiers.

As shown in Fig. 2, each electrical signalling system includes an individual source of electrical power, indicated diagrammatically by a battery 10, for energizing its amplifier 8 and its potentiometers 7, 9. Pick-offs 16, 16A, 16B actuated by the control member 6 coact with the potentiometers 7, 7A and 7B and pick-offs 17, 17A, 17B coact with the potentiometers 9, 9A, 9B.

The system is thus a majority signal arrangement since if one of the electrical systems should fail and work against the others, the other two can overpower it. It is important that signals from all the amplifiers should be fed to each transducer. Otherwise, since the output pick-offs 17, 17A, 17B are concerned solely with the position of the control surface, and since the amplifiers and therefore the control valves 4, 4A, 4B may get out of phase, the cylinder 3 could come to rest in a position in which some or all of the control valves 4, 4A, 4B are open, so causing a large flow. When, however, each transducer is responsive to the sum of the signals sent from all the amplifiers, lack of phase correspondence between the amplifiers will not matter since each control valve will necessarily receive the same displacement. If an electrical fault should develop in one of the signalling systems, the result is merely loss of power to operate the control valves, and the equipment can be designed with a sufficient reserve of power to ensure that there will be no reduction in output if one of the systems should fail. There will be reduction in output only if one of the control valves should stick in an open position. The other two valves will then cancel on a flow basis the tendency of the servo motor to run away due to the sticking valve.

If desired the transducers 5, 5A, 5B may also accept signals from an auto-pilot and/or an auto-stabilizer via the amplifiers 8, 8A, 8B. Also, provision may be made for reversion to mechanical control by the pilot of the servo motor in the event of an emergency, e.g. as described in U.S. Patent No. 2,823,879.

It is necessary that the amplifiers 8, 8A, 8B should saturate at an input level proportional to a misalignment between the input and output members of the servo motor small in relation to the total stroke of the output member.

What we claim as our invention and desire to secure by Letters Patent is:

1. A power operated flying control system for aircraft comprising, in combination with a pilot's control member, a control surface, a servo motor having an output member coupled to said control surface and operable to move said control surface to positions selected by said control member, and at least three individually operable input members for controlling operation of said servo motor, said input members being movable from a neutral position to effect corresponding movement of said output member, a plurality of electromechanical transducer mechanisms each associated with and arranged to operate one of said input members, and at least three electrical control circuits each of which is interconnected with all of said transducer mechanisms, each of said circuits including an element operable by said control member on movement thereof to supply to all of said transducer mechanisms electrical signals representative of the extent of said movement, thereby causing said input members to be moved from their neutral positions by a corresponding amount, and an element operable by said output member to supply to all of said transducer mechanisms in response to movement of said output member electrical feedback signals, whereby said input members are returned to their neutral positions on movement of said output member to the position selected by said control member.

2. A system as claimed in claim 1, wherein each transducer mechanism is constituted by a single transducer having a plurality of operating coils each forming part of one of said electrical control systems.

3. A power operated flying control system for aircraft comprising, in combination with a pilot's control member, a control surface, a servo motor having an output member coupled to said control surface and operable to move said control surface to positions selected by said control member, and at least three individually operable input members for controlling operation of said servo motor, said input members being movable from a neutral position to effect corresponding movement of said output member, a plurality of electromechanical transducer mechanisms each associated with and arranged to operate one of said input members, and at least three electrical control circuits each of which is interconnected with all of said transducer mechanisms, each of said circuits including an amplifier energized by an individual source of electric power and two potentiometers also energized by said source, each of said amplifiers being connected to all of said transducer mechanisms, and one of the potentiometers in each circuit being adjustable by said control member on movement thereof to supply input electrical signals to the amplifier and thereby to cause said transducer mechanisms to move said input members from their neutral positions to an extent corresponding to the movement of said control member and the other potentiometer in each circuit being adjustable by said output member on movement thereof to supply feedback electrical signals to the amplifier and thereby to cause said transducer mechanisms to return said input members to their neutral position on movement of said output member to the position selected by said control member.

4. A power operated flying control system for aircraft comprising, in combination with a pilot's control member, a control surface, a hydraulic servo motor comprising a cylinder and piston, one of which constitutes an output member coupled to said control surface and operable to move said control surface to positions selected by said control member and at least three individually operable control valves each of which is movable from a neutral position to establish pressure and exhaust connections to said cylinder and thereby to cause relative movement of said piston and cylinder, and a plurality of electromechanical transducer mechanisms each associated with and arranged to operate one of said control valves, and at least three resistance-voltage bridge networks each of which is individually connected with all of said transducer mechanisms, each of said networks including an element operable by said control member on movement thereof to supply to all of said transducer mechanisms electrical signals representative of the extent of said movement, thereby causing said control valves to be moved from their neutral positions by a corresponding amount, and an element operable by said output member to supply to all of said transducer mechanisms in response to movement of said output member electrical feedback signals, whereby said control valves are returned to their neutral positions on movement of said output member to the position selected by said control member.

5. A system as claimed in claim 4, wherein each network comprises an amplifier energized by an individual source of electric power, each of said amplifiers being connected to all of said transducer mechanisms, and wherein said elements in each network are potentiometers which are respectively operable by said control member and by said output member to supply input and feedback electrical signals to said amplifier.

References Cited in the file of this patent

UNITED STATES PATENTS

| 2,262,173 | Fischer | Nov. 11, 1941 |
| 2,602,611 | Glenny | July 8, 1952 |

FOREIGN PATENTS

| 986,906 | France | Apr. 11, 1951 |